Aug. 13, 1963
L. G. SCHNEIDER
3,100,474
COMMODE FOR PETS
Filed Sept. 27, 1961
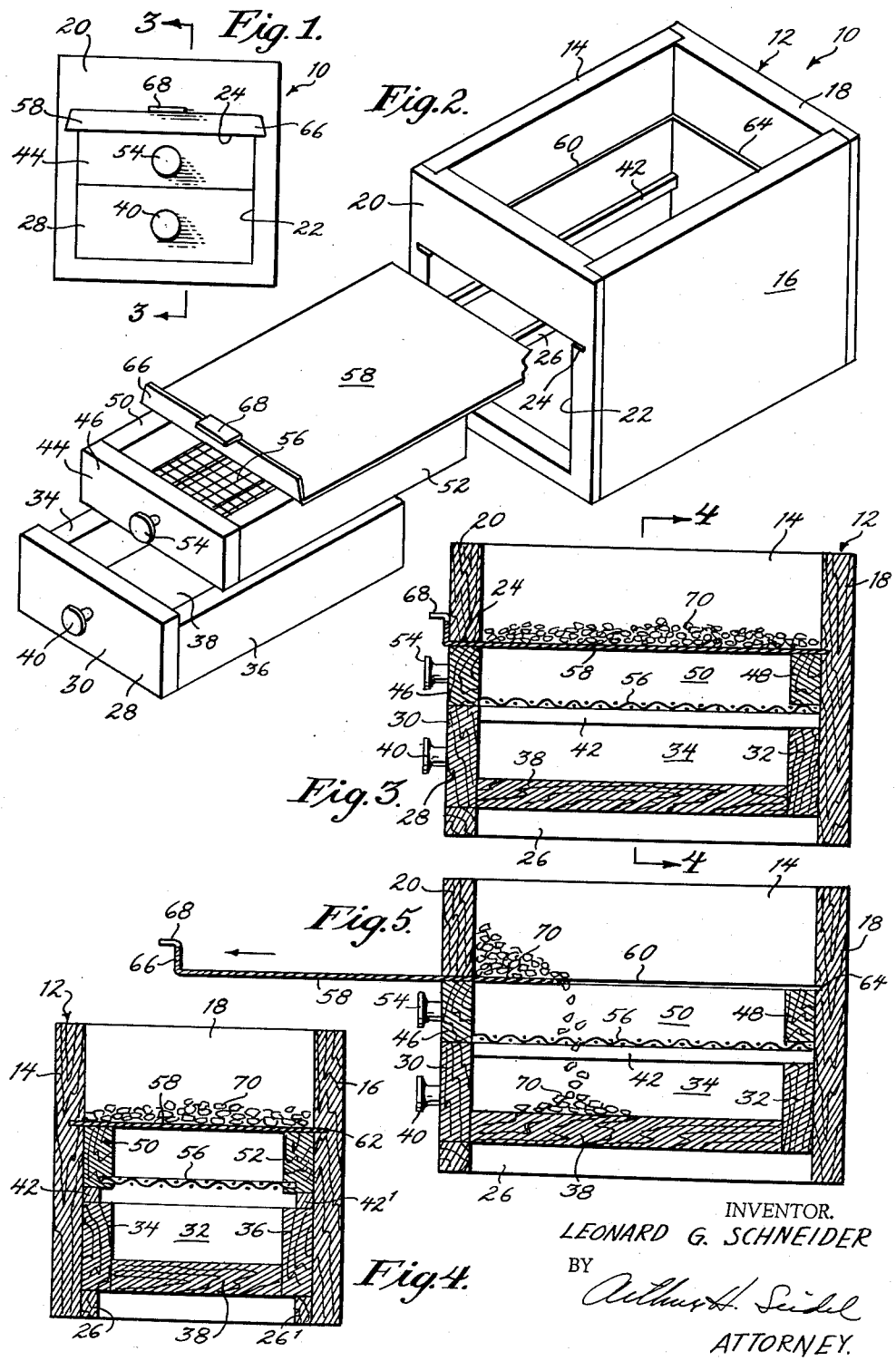
INVENTOR.
LEONARD G. SCHNEIDER
BY
Arthur H. Seidel
ATTORNEY.

United States Patent Office 3,100,474
Patented Aug. 13, 1963

3,100,474
COMMODE FOR PETS
Leonard Gabriel Schneider, 532 Bethlehem Pike, Whitemarsh, Pa.
Filed Sept. 27, 1961, Ser. No. 141,191
4 Claims. (Cl. 119—1)

This invention relates to a commode for pets, and more particularly, to a commode particularly adaptable for use by cats, dogs, etc.

A wide variety of pet commodes have been proposed heretofore. Each of the commodes proposed heretofore suffer from any one of a plurality of disadvantages. In general, the commodes proposed heretofore do not provide a means for separating excrement from litter or are difficult to clean.

The commode of the present invention is designed to be placed in any convenient location on the floor or any other convenient supporting surface. The commode of the present invention includes a generally rectangular housing lacking a top wall. The housing is provided with three movable elements positioned in a relationship so that excrement is deposited on a bed of litter, the litter may be readily separated from the excrement, whereby the litter may be utilized a plurality of times. The automatic separation of litter and excrement facilitates cleaning the commode of the present invention. Prior to re-use, the litter may be washed or otherwise cleaned in any convenient manner.

It is an object of the present invention to provide a novel commode for pets.

It is another object of the present invention to provide a novel commode for pets wherein means are provided to automatically separate excrement from litter.

It is another object of the present invention to provide a novel commode for pets which is easier to clean than those proposed heretofore.

It is still another object of the present invention to provide a commode for pets which is simple, economical to manufacture, and easy to use.

It is still another object of the present invention to provide an open top commode for pets wherein a bed of litter is provided for pets, with means being provided to automatically separate excrement from the litter.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a front elevational view of the commode of the present invention.

FIGURE 2 is an exploded perspective view of the commode of the present invention.

FIGURE 3 is a longitudinal sectional view taken along the lines 3—3 in FIGURE 1.

FIGURE 4 is a transverse sectional view taken along the lines 4—4 in FIGURE 3.

FIGURE 5 is a longitudinal sectional view similar to FIGURE 3, but illustrating the manner in which the commode is to be used.

Referring to the drawing in detail, wherein like numerals indicate like elements, there is shown in FIGURE 1 a commode designated generally as 10.

The commode 10 includes a generally rectangular housing 12 lacking a top wall. The housing 12 includes spaced parallel side walls 14 and 16, a rear wall 18 and a front wall 20. As shown more clearly in FIGURE 2, the front wall 20 is provided with an aperture or opening 22 and a slot 24 extending across the upper edge of the slot 22.

As shown more clearly in FIGURE 4, a pair of supporting strips 26 and 26' are provided so as to be flush with the bottom of the side walls 14 and 16. The strip 26 is secured to the side wall 14 in any convenient manner such as by use of nails. Likewise, the strip 26' is secured to the side wall 16. A tray 28 having dimensions which are smaller than the aperture 22 is reciprocably disposed on the strips 26 and 26'.

The tray 28 includes a front wall 30, a back wall 32, side walls 34 and 36 extending between the walls 30 and 32, and a bottom wall 38. The tray 28 lacks a top wall. The front wall 30 is provided with a handle 40 which facilitates reciprocation of the tray 28 for a purpose to be made clear hereinafter.

The front wall 30 has a height which is approximately one-half the height of the aperture 22. A mounting strip 42 is secured to the side wall 14 of the housing 12 at a point slightly above the upper edge of the tray 28. The strip 42 is secured to the side wall 14 in any convenient manner such as by use of nails. A strip 42', identical with strip 42, is secured to the side wall 16 of the housing 12. The strips 42 and 42' are horizontally disposed and parallel to the strips 26 and 26'.

A screen member 44 is reciprocably disposed within the housing 12 on the strips 42 and 42'. The member 44 includes a front wall 46, a back wall 48, and side walls 50 and 52 which extend between the walls 46 and 48. A handle 54 is provided on the front wall 46 of the member 44. As shown more clearly in FIGURE 4, the side walls 50 and 52 are slotted and support a screen 56 in the slots.

A plate member 58 is reciprocably disposed above the member 44. The combined height of the front wall 30 on the tray 28 and the front wall 46 on the member 44 corresponds with the height of the aperture 22. Accordingly, the plate member 58 is reciprocably disposed within the slot 24 and rests on the upper edge of the wall 46 of the member 44. The top surface of the plate 58 is in scraping contact with the upper edge of the aperture or opening 22. To facilitate reciprocation of the plate member 58, the side wall 14 is provided with a slot 60 coextensive with the slot 24, the side wall 16 is provided with a slot 62 coextensive with the slot 24, and the rear wall 18 is provided with a slot 64 coextensive with the slots 24, 60 and 62.

The plate member 58 is provided with an upstanding front wall 66 having a handle 68 thereon. The plate member 58 is preferably made from an imperforate metal material such as aluminum or the like. In this manner, the plate member 58 will be light in weight, will be able to support litter 70 thereon in addition to the weight of the pet.

The housing 12, the tray 28 and the frame for the screen member 44 are made from wood as illustrated in the drawing. It is within the scope of the present invention to make these elements from plastic materials, lightweight non-corrosive material such as aluminum, etc. While the plate member 58 is preferably imperforate, it may be perforated with minute holes which are smaller than the litter and the solid excrement from the animals which may use the commode 10 of the present invention. The apertures in the screen 56 are of sufficient size so as to only permit the litter 70 to pass therethrough. The screen 56 is preferably made from a non-corrosive material such as aluminum.

The manner in which the commode 10 is utilized is as follows:

The commode 10 with its elements disposed in the manner illustrated in FIGURES 1, 3 and 4 is disposed in any convenient location. A bed of litter 70 is provided on the plate member 58. The animal will be trained to sit on the bed of litter 70 so that solid excrement is deposited on said bed of litter 70.

Thereafter, the animal's master may reciprocate the plate member 58 to a disposition as illustrated in FIGURE 5. In this position of the plate member 58, the litter and solid excrement fall onto the screen 56. The nature of the apertures in the screen 56 permits only the litter 70 to pass therethrough. The litter 70 which has passed through the screen 56 is deposited in the tray 28.

Thereafter, the plate member 58 may be reciprocated to the position illustrated in FIGURES 3 and 4. Then the tray 28 may be withdrawn from the position shown in FIGURES 3-5 and the litter 70 therein re-deposited on the plate member 58. If desired, the litter 70 may be washed prior to being re-deposited on the plate member 58. When desired, the screen member 44 may be withdrawn and cleaned by spraying water thereon from a hose or the like. Thus, it will be seen that the commode 10 of the present invention may be rapidly cleaned and the solid excrement separated from the litter in a simple manner which is automatic.

To those skilled in the art, the litter most popularly utilized with pets such as dogs, cats, and the like is in the nature of small clean pebbles. The litter 70 is preferably deposited on the plate member 58 so as to form a bed having a thickness of approximately one to two inches. Each time the litter is circulated, the litter 70 adjacent the plate member 58 will be re-deposited so as to be adjacent the top of the bed. Thus, it is not necessary to clean the litter each time the commode 10 is utilized by an animal.

The present invention may be embodied in other specific forms without departing from the spirit or essential attributes thereof and, accordingly, reference should be made to the appended claims, rather than to the foregoing specification as indicating the scope of the invention.

I claim:

1. A commode for pets comprising an enclosure having an open top and upstanding sides, one of said sides having an opening therein, said one side having a horizontal slot therein of a length greater than the width of said opening extending across and defining an upper edge of said opening, a slideable imperforate plate removably mounted in said slot and having a top surface in scraping contact with said upper edge of said opening, a screening member removably mounted in said opening and spaced below said plate, said screening member having holes therein permitting litter to pass therethrough, and a tray movably mounted below said screening member for receiving litter which passes through said screen.

2. A commode in accordance with claim 1 wherein said upstanding sides include a back wall, a front wall, and side walls extending between said back and front walls, said front walls having said opening therein, and said plate, screening member and tray being reciprocally supported for movement through said opening in said front wall of said housing.

3. A commode in accordance with claim 2 wherein said side walls and rear wall have a slot therein coextensive with the slot in said front wall for receiving said plate member.

4. The commode of claim 2 wherein said screening member and said tray each have a front wall, the combined height of the front wall in said screening member and the front wall on said tray being much greater than the height of said aperture.

References Cited in the file of this patent

UNITED STATES PATENTS

| | | |
|---|---|---|
| 681,823 | Atkins | Sept. 3, 1901 |
| 1,347,397 | Newman | July 20, 1920 |
| 1,803,413 | Trites | May 5, 1931 |
| 1,896,097 | Palmer | Feb. 7, 1933 |
| 2,163,766 | Spencer | June 27, 1939 |
| 2,963,003 | Oberg et al. | Dec. 6, 1960 |
| 2,971,493 | Robb | Feb. 14, 1961 |